(12) United States Patent
Friedlander et al.

(10) Patent No.: US 9,460,393 B2
(45) Date of Patent: *Oct. 4, 2016

(54) INFERENCE OF ANOMALOUS BEHAVIOR OF MEMBERS OF COHORTS AND ASSOCIATE ACTORS RELATED TO THE ANOMALOUS BEHAVIOR BASED ON DIVERGENT MOVEMENT FROM THE COHORT CONTEXT CENTROID

(71) Applicant: INTERNATIONAL BUSINESS MACHINES CORPORATION, Armonk, NY (US)

(72) Inventors: Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/672,578

(22) Filed: Mar. 30, 2015

(65) Prior Publication Data

US 2015/0206056 A1 Jul. 23, 2015

Related U.S. Application Data

(63) Continuation of application No. 13/705,882, filed on Dec. 5, 2012, now Pat. No. 9,087,298.

(51) Int. Cl.
| | | |
|---|---|---|
| G06F 17/00 | (2006.01) | |
| G06N 5/00 | (2006.01) | |
| G06N 5/04 | (2006.01) | |
| G06K 9/62 | (2006.01) | |
| H04L 29/06 | (2006.01) | |

(52) U.S. Cl.
CPC .............. *G06N 5/04* (2013.01); *G06K 9/6272* (2013.01); *G06N 5/043* (2013.01); *H04L 67/42* (2013.01)

(58) Field of Classification Search
None
See application file for complete search history.

(56) References Cited

U.S. PATENT DOCUMENTS

| | | |
|---|---|---|
| 6,925,389 B2 | 8/2005 | Hitt et al. |
| 7,333,895 B2 | 2/2008 | Hitt et al. |
| 7,805,391 B2 | 9/2010 | Friedlander et al. |
| RE42,663 E | 8/2011 | Lazarus et al. |
| 2008/0016412 A1 | 1/2008 | White et al. |
| 2009/0240513 A1 | 9/2009 | Angell et al. |
| 2010/0046327 A1 | 2/2010 | Orlin et al. |

OTHER PUBLICATIONS

Marghny et al. "Outlier Detection using Improved Genetic K-means", International Journal of Computer Applications, vol. 28, No. 11, 2011, pp. 33-36.*
Zhang et al. "BIRCH: An Efficient Data Clustering Method for Very Large Databases", SIGMOD, 1996, pp. 103-114.*
Dravins, D. et al; Astrometric Radial Velocities From Hipparcos; ESA Symposium 'Hipparcos—Venice'97; 1997; 6 pages.
Gaber, M. et al.; Detection and Classification of Changes in Evolving Data Streams; International Journal of Information Technology & Decision Making; 2006; 12 pages.
Li, X. et al. "Motion-Alert: Automatic Anomaly Detection in Massive Moving Objects." Intelligence and Security Informatics; Lecture Notes in Computer Science vol. 3975, pp. 166-177, 2006.
U.S. Appl. No. 13/705,882; Notice of Allowance dated Mar. 11, 2015 and Non-Final Rejection dated Nov. 25, 2014.

* cited by examiner

Primary Examiner — Li-Wu Chang
(74) Attorney, Agent, or Firm — Brown & Michaels, PC; John R. Pivnichny

(57) ABSTRACT

A method, a system and a computer program product for determining whether a change in value of a data item relating to an entity being tracked within a cohort is statistically and contextually significant. A computer captures a plurality data items relating to the entity being tracked at a time N+1. The value of the data item at time N+1 is compared to a value of a historical data item at time N. If the value of the data item at time N+1 is different from the value of the historical data item at time N, determining that a change has occurred. If a change in a data item has occurred, determining whether the change in the data item is related to the entity being tracked is statistically and contextually significant in n space on multiple dimensions.

20 Claims, 4 Drawing Sheets

US 9,460,393 B2

INFERENCE OF ANOMALOUS BEHAVIOR OF MEMBERS OF COHORTS AND ASSOCIATE ACTORS RELATED TO THE ANOMALOUS BEHAVIOR BASED ON DIVERGENT MOVEMENT FROM THE COHORT CONTEXT CENTROID

CROSS-REFERENCE TO RELATED APPLICATIONS

This is a continuation of copending application Ser. No. 13/705,882, filed Dec. 5, 2012, entitled "INFERENCE OF ANOMALOUS BEHAVIOR OF MEMBERS OF COHORTS AND ASSOCIATE ACTORS RELATED TO THE ANOMALOUS BEHAVIOR BASED ON DIVERGENT MOVEMENT FROM THE COHORT CONTEXT CENTROID". The aforementioned application is hereby incorporated herein by reference.

BACKGROUND

A cohort is a group of individuals with common characteristics. The present invention relates to cohorts, and more specifically to the detection of anomalous behavior by members of cohorts and associate actors, and drawing inferences related to the anomalous behavior based on divergent movement from the cohort context centroid.

Determining causes of events is a difficult task, but is often key to understanding how and why events are taking place. It is difficult to discern what is coincidental versus causal when looking at a very large and varied group of related data through time.

SUMMARY

According to one illustrative embodiment of the present invention, a method of determining whether a change in value of a data item relating to an entity being tracked within a cohort is statistically and contextually significant. The method comprising: a computer capturing a plurality data items relating to the entity being tracked at a time N+1; the computer comparing the value of the data item at time N+1 to a value of a historical data item at time N; if the value of the data item at time N+1 is different from the value of the historical data item at time N, the computer determining that a change has occurred; if a change in a data item has occurred, the computer determining whether the change in the data item related to the entity being tracked is statistically and contextually significant in n space on multiple dimensions.

According to another illustrative embodiment of the present invention, a computer program product for determining whether a change in value of a data item relating to an entity being tracked within a cohort is statistically and contextually significant. The computer program product comprising: one or more computer-readable, tangible storage devices; program instructions, stored on at least one of the one or more storage devices, to capture a plurality data items relating to the entity being tracked at a time N+1; program instructions, stored on at least one of the one or more storage devices, to compare the value of the data item at time N+1 to a value of a historical data item at time N; if the value of the data item at time N+1 is different from the value of the historical data item at time N, program instructions, stored on at least one of the one or more storage devices, to determine that a change has occurred; if a change in a data item has occurred, program instructions, stored on at least one of the one or more storage devices, to determine whether the change in the data item related to the entity being tracked is statistically and contextually significant in n space on multiple dimensions.

According to another illustrative embodiment of the present invention, a system for determining whether a change in value of a data item relating to an entity being tracked within a cohort is statistically and contextually significant. The system comprising: one or more processors, one or more computer-readable memories and one or more computer-readable, tangible storage devices; program instructions, stored on at least one of the one or more storage devices for execution by at least one of the one or more processors via at least one of the one or more memories, to capture a plurality data items relating to the entity being tracked at a time N+1; program instructions, stored on at least one of the one or more storage devices for execution by at least one of the one or more processors via at least one of the one or more memories, to compare the value of the data item at time N+1 to a value of a historical data item at time N; if the value of the data item at time N+1 is different from the value of the historical data item at time N, program instructions, stored on at least one of the one or more storage devices for execution by at least one of the one or more processors via at least one of the one or more memories, to determine that a change has occurred; if a change in a data item has occurred, program instructions, stored on at least one of the one or more storage devices for execution by at least one of the one or more processors via at least one of the one or more memories, to determine whether the change in the data item related to the entity being tracked is statistically and contextually significant in n space on multiple dimensions.

DETAILED DESCRIPTION

The illustrative embodiments provide a computer implemented method, apparatus, and computer usable program code for generating cohorts at a specific time through clustering of data items of entities being tracked and based on parameters. Results of a clustering process are used to provide inferences of anomalous behavior of the data items or members of the cohort based on divergent movement of members of the cohorts from the centroids, and obtaining causal context factors from that movement. In other words, the results of the clustering process can determine data items related to each other at one instant of time which can be summed across n space on multiple planes to determine data items that imply cause through context.

Figure 1:
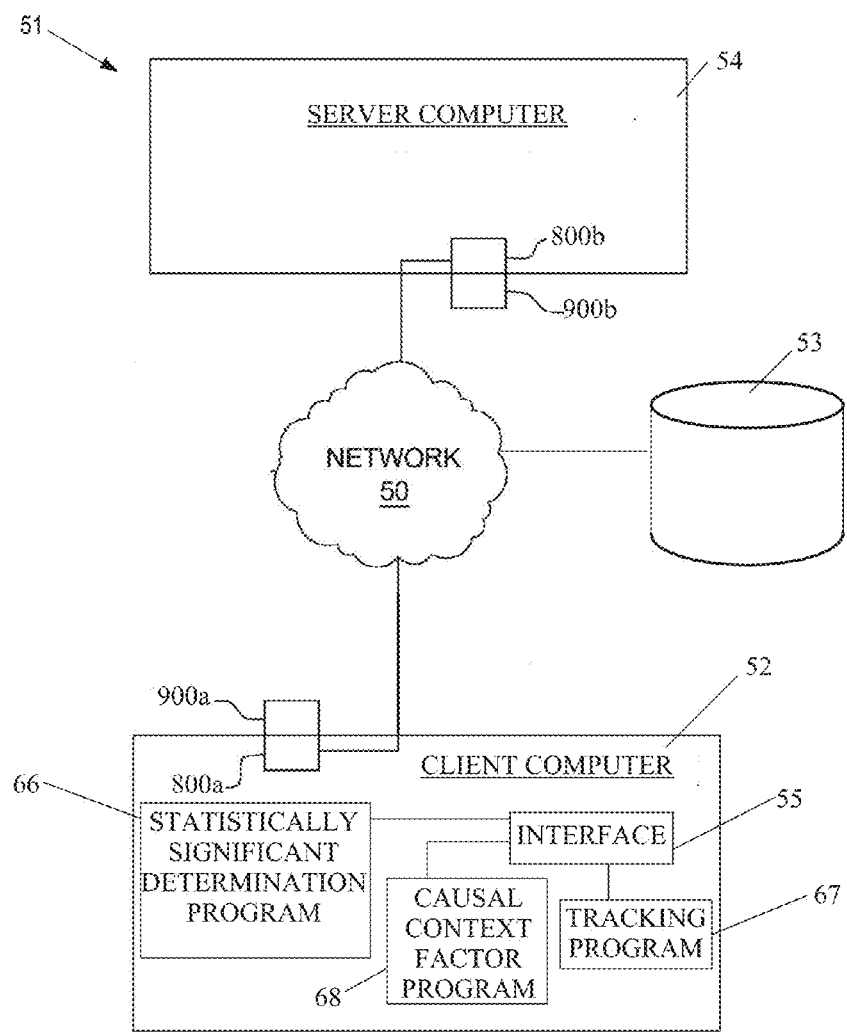
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a client computer 52, server computer 54, and a repository 53 connect to network 50. In other exemplary embodiments, network data processing system 51 may include additional client computers, storage devices, server computers, and other devices not shown. The client computer 52 includes a set of internal components 800a and a set of external components 900a, further illustrated in FIG. 4. The client computer 52 may be, for example, a mobile device, a cell phone, a personal digital assistant, a netbook, a laptop computer, a tablet computer, a desktop computer, a sequencing machine or any other type of computing device.

Client computer 52 may contain an interface 55. The interface can be, for example, a command line interface, a graphical user interface (GUI), or a web user interface (WUI). The interface may be used, for example for viewing clusters, centroids, statistical dispersion results, causal context factors, and data items in a repository. The interface may also accept an input regarding parameters associated with forming and determining clusters and setting predetermined dispersion measurements.

In the depicted example, server computer 54 provides information, such as boot files, operating system images, and applications to client computer 52. Server computer 54 can compute the information locally or extract the information from other computers on network 50. Server computer 54 includes a set of internal components 800b and a set of external components 900b illustrated in FIG. 4.

Figure 4:
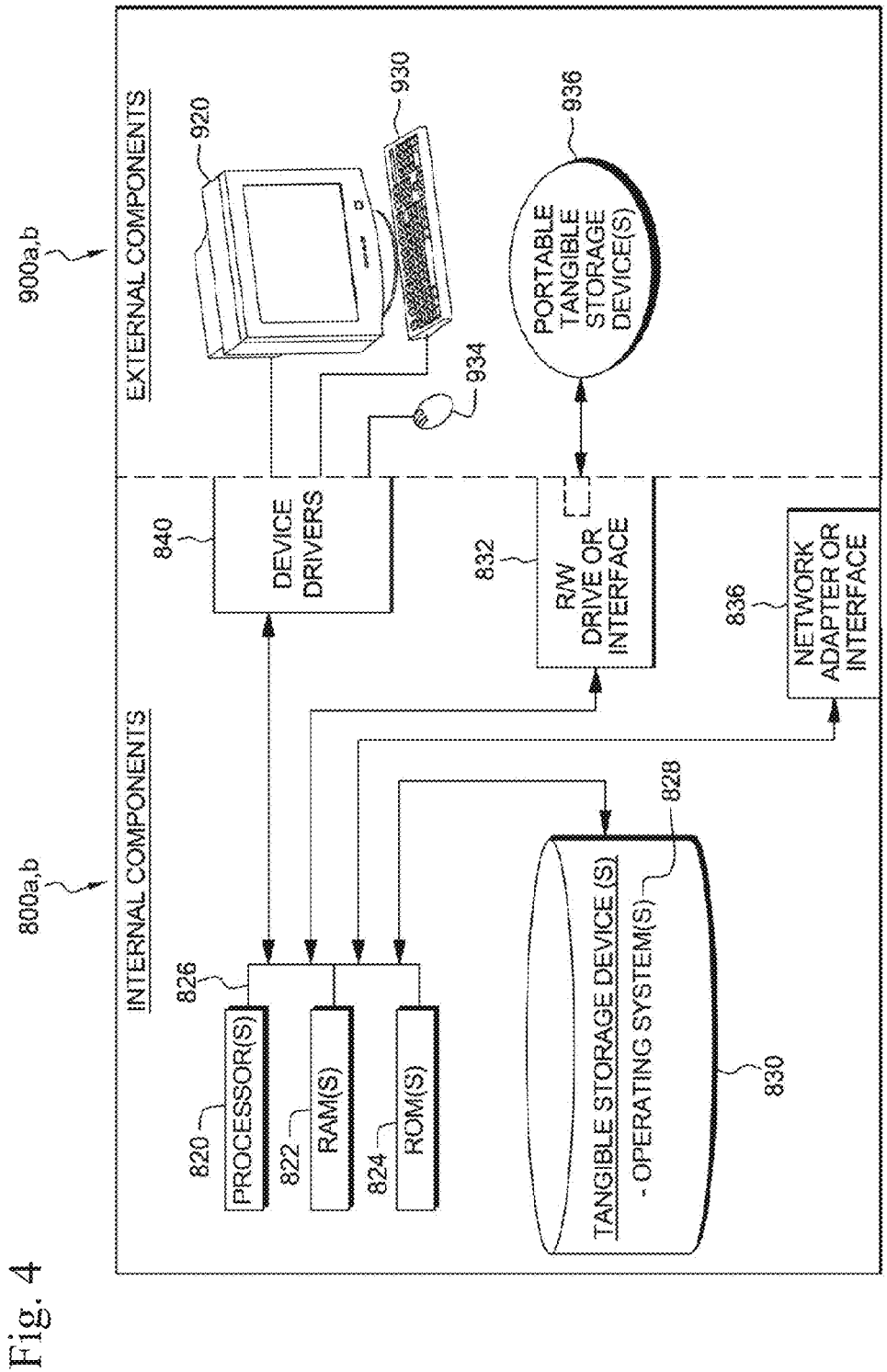
FIG. 4 illustrates internal and external components of a client computer and a server computer in which illustrative embodiments may be implemented.

Program code and programs such as a tracking program 67 a statistically significant determination program 66, and a causal context factor program 68 may be stored on at least one of one or more computer-readable tangible storage devices 830 shown in FIG. 4, on at least one of one or more portable computer-readable tangible storage devices 936 as shown in FIG. 4, or repository 53 connected to network 50, or downloaded to a data processing system or other device for use. For example, program code, a tracking program 67, a causal context factor program 68, and a statistically significant determination program 66 may be stored on at least one of one or more tangible storage devices 830 on server computer 54 and downloaded to client computer 52 over network 50 for use on client computer 52. Alternatively, server computer 54 can be a web server, and the program code, a tracking program 67, a causal context factor program 68 and a statistically significant determination program 66 may be stored on at least one of the one or more tangible storage devices 830 on server computer 54 and accessed on client computer 52. Tracking program 67, causal context factor program 68 and statistically significant determination program 66 can be accessed on client computer 52 through interface 55. In other exemplary embodiments, the program code and programs such as a tracking program 67, a causal context factor program 68 and a statistically significant determination program 66 may be stored on at least one of one or more computer-readable tangible storage devices 830 on client computer 52 or distributed between two or more servers.

Figure 2:
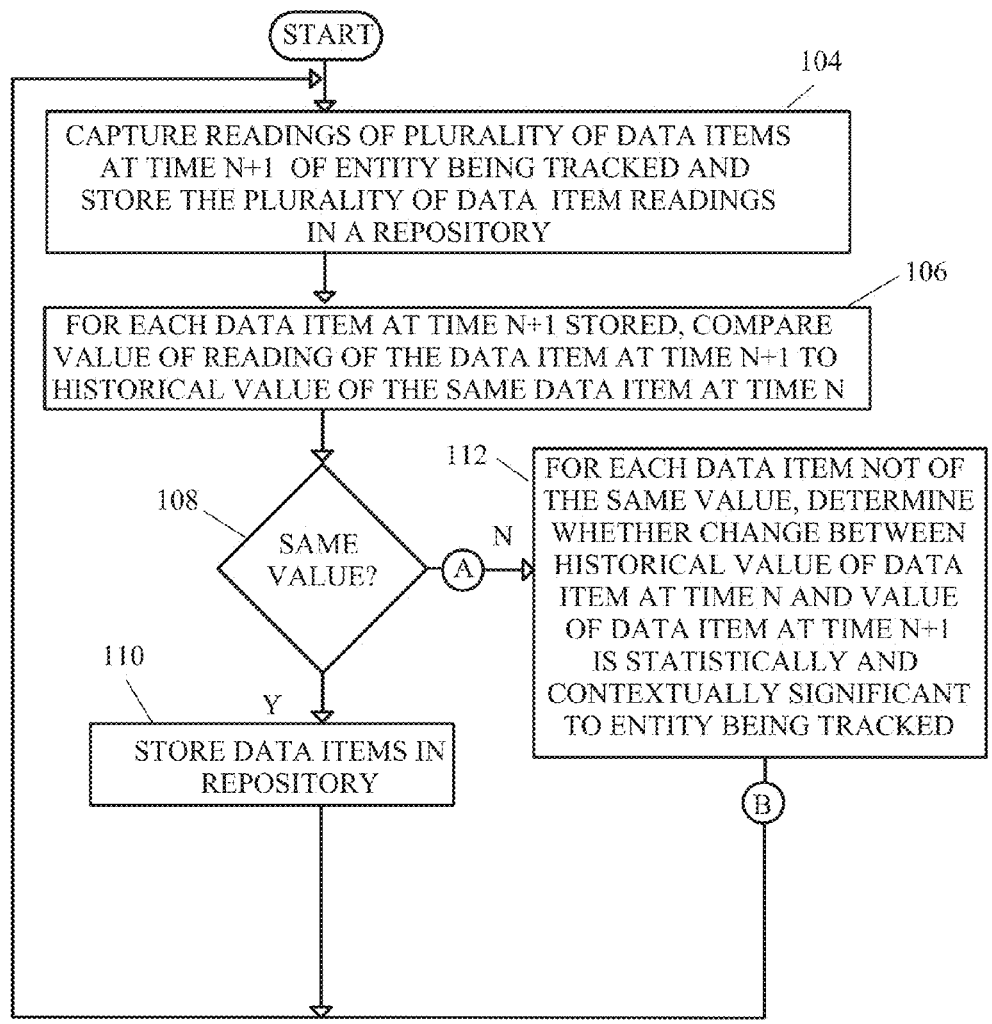
FIG. 2 shows a flowchart of a method for detection of anomalous behavior by members of cohorts and associate actors, and drawing inferences related to the anomalous behavior based on divergent movement from the cohort context centroid.

FIG. 2 shows a method of the detection of anomalous behavior by members of cohorts and associate actors ("entities"), and drawing inferences related to the anomalous behavior of the entities based on divergent movement from the cohort context centroid.

In a first step, readings of data regarding items that have been altered ("data items") are captured. The data items are captured at one instant of time (i.e. N+1), and stored in a repository (step 104), for example repository 53. Capturing all of the data from all of the plurality of sensors at one instant of time allows the method to better be able to compare behavior and context for an entity being tracked through time. It should be noted that each of the plurality of sensors may have varied sensitivities or weights for each of the data items being tracked. So, for example, if tracking "how many transactions included the purchase of green beans" is more important than tracking another transaction such as "purchase of diapers", the sensitivity or weight associated to a transaction that included green beans would be higher than that of the sensitivity or weight associated with a transaction including the purchase of diapers.

For each data item stored at time N+1, the value of the reading of the data time at time N+1 is compared to the historical value of the same data item at time N (step 106), for example by the statistically significant determination program 66. If the value is the same (step 108), the data items are stored in a repository and the method returns to step 102 of detecting alterations of item(s) being tracked by a plurality of sensors.

If the value of the data item at time N+1 is not the same as the historical value of the same data item at time N, the change between the historical value of the data item at time N and the value of the data item at time N+1 is analyzed to determine whether the change is statistically and contextually significant to the item being tracked in n dimensions across multiple planes (step 112).

Figure 3:
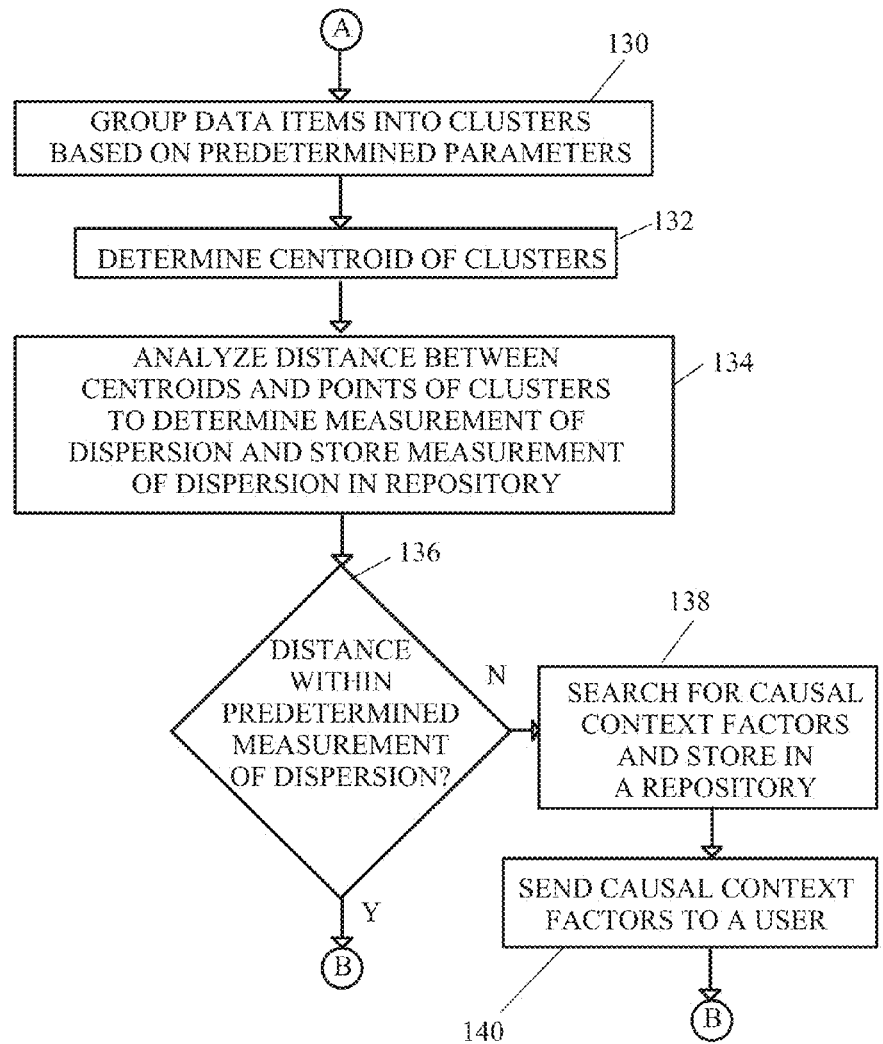
FIG. 3 shows a flowchart of a method of determining whether a change between a historical value of data at time N and value of data item at time N+1 is statistically and contextually significant to the entity being tracked through anomalous behavior of cohorts.

The determination of whether the change between the data items at time N+1 and N is statistically and contextually significant is determined through steps 130-140 shown in FIG. 3. After these steps, the method then returns to step 104 of capturing data items.

Referring to FIG. 3, the data items captured at time N+1 are grouped or populated into clusters based on predetermined parameters (step 130), for example by the statistically significant determination program 66. The parameters may for example include demographic parameters, phenotypic parameters and geographic parameters. The clusters may further be limited or defined by factors such as cluster size, the number of clusters, or the density of clusters.

A centroid is the center of a mass. A centroid of each cluster is determined (step 132), for example by the statistically significant determination program 66. Calculation of the centroid after all of the data items have been assigned typically moves the centroid, and causes the assignment of the points to the cluster to be inaccurate. So, a Euclidean distance in multiple dimensions may be calculated for each data item match to a centroid for each cluster. The data items may be reassigned to the new centroid by the shortest Euclidean distance in multiple dimensions between the new centroids of the clusters and the data items.

After the centroid for each cluster has been determined in step 132, the distance between the centroid and points of the cluster are analyzed to determine a measurement of dispersion, and the measurement of dispersion of the cluster is stored in a repository (step 134), for example by the statistically significant determination program 66. The measurement of dispersion may be, for example, standard deviation, chi square, variance or interquartile range.

For example, it might be determined that data items could normally be expected to occur within a predetermined measurement—say, one standard deviation—of a centroid, and such data items can be ignored. Therefore, if the distance of a given data item from the centroid of a cluster to which it belongs is within a predetermined measurement of dispersion for the cluster (step 136), the method returns to step 104 of capturing data items.

If the distance of a given data item from the centroid of a cluster to which it belongs is not within the predetermined measurement of dispersion for the cluster (step 136), this means that the data item is an "outlier"—that is, it is sufficiently outside the measurement of dispersion to be of interest for further analysis. Causal context factors are searched for and stored in a repository (step 138), for example by the causal context factor program 68. The causal context factors may be any factor that could have caused the distance of a data item within the cluster to be outside of the predetermined measurement of dispersion from the centroid of the cluster, and possibly aid in inferring the anomalous behavior of the data item or member of the cluster based on divergent movement from the centroid.

The causal context factors may be procured through a data mining functionality. Data mining is the process of automatically searching large volumes of data for patterns. Data mining may be further defined as the nontrivial extraction of implicit, previously unknown, and potentially useful information from data. Data mining may use computational techniques from statistics, information theory, machine learning, and pattern recognition. Particularly, data mining extracts useful information from databases. Data mining allows users to select data, analyze data, show patterns, sort data, determine relationships, and generate statistics. In one example, data mining may be carried out through a program, for example causal context factor program 68, which may be "DB2 Intelligent Miner" produced by International Business Machines Corporation.

The causal context factors are then sent to a user (step 140) for further analysis relative to the entities being tracked and return to step 104 of capturing data items.

For example, a company may want to track why the number of flu shots administered in their stores have decreased and/or why the number of abandonments (signed in to receive the shot, but the shot is never administered) has increased. For this company, historically the percentage of abandonments was 25%, with the remaining 75% being administered a flu shot. Now the number of abandonments has increased to 50%.

To determine why the abandonment rate has increased, numerous data items are captured at the time a consumer entered the store. Such data items can be, for example, the number of people signed up to receive a flu shot and who took a clipboard with the paperwork to fill out; the average projected wait time reported to receive the flu shot; the actual reported wait time to receive the flu shot, the abandonment rate of consumers who signed in but did not wait for or get the flu shot; the average time for a consumer to fill out the paperwork, etc. . . .

When a consumer enters the store for a flu shot, data regarding all of the items listed above would be captured at the same time and stored in a repository. The values of the data items would be compared to the same data items captured at that time during the last flu season. If there is a difference in value, the data items would be grouped into clusters, and a centroid of the cluster determined. For example, the average projected wait time could be 6 minutes this time instead of 5 minutes historically, and all of the historical wait times are in a cluster with a centroid of the cluster being 6.5 minutes. The distance between the centroid and all of the points is then analyzed to determine a measurement of dispersion, for example one standard deviation.

Suppose that there are some points within the cluster of wait time that are 22 minutes or 17 minutes. The distances measured between these points and the centroid is not within the specific predetermined value (one standard deviation). Therefore, the system would then search for causal context factors through data mining—perhaps a new procedure was implemented which increased the amount of paperwork at the front of the store prior to seeing the nurse who administers the shot, thus increasing the wait time to receive the flu shot.

FIG. 4 illustrates internal and external components of client computer 52 and server computer 54 in which illustrative embodiments may be implemented. In FIG. 4, client computer 52 and server computer 54 include respective sets of internal components 800a, 800b, and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, a tracking program 67, causal context factor program 68 and statistically significant determination program 66 are stored on one or more of the computer-readable tangible storage devices 830 for execution by one or more of the processors 820 via one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A tracking program 67, causal context factor program 68 and a statistically significant determination program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Tracking program 67, causal context factor program 68 and statistically significant determination program 66 can be downloaded to client computer 52 and server computer 54 from an external computer via a network (for example, the Internet, a local area network or other, wide area network) and network adapter or interface 836. From the network adapter or interface 836, a tracking program 67, causal context factor program 68, and statistically significant determination program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Tracking program 67, causal context factor program 68 and statistically significant determination program 66 can be written in various programming languages including low-level, high-level, object-oriented or non object-oriented languages. Alternatively, the functions of an a tracking program 67, causal context factor program 68 and statistically significant determination program 66 can be implemented in whole or in part by computer circuits and other hardware (not shown).

Based on the foregoing, a computer system, method and program product have been disclosed for determining whether a value change is statistically and contextually significant in n dimensions to an item being tracked. However, numerous modifications and substitutions can be made without deviating from the scope of the present invention. Therefore, the present invention has been disclosed by way of example and not limitation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of determining whether a change in value of a data item relating to an entity being tracked within a cohort satisfies a predetermined measurement of statistical and contextual significance, the method comprising the steps of:
   a computer capturing a plurality of data items relating to the entity being tracked at a time N+1 by a plurality of sensors with the plurality of sensors having varied sensitivity for each of the plurality of data items being captured;
   the computer comparing the value of one of the data items at time N+1 to a value of a historical data item at time N;
   if the value of one of the data items at time N+1 is different from the value of the historical data item at time N, the computer determining that a change has occurred;
   if a change in one of the data items has occurred, the computer determining whether the change in one of the data items related to the entity being tracked satisfies the predetermined measurement of statistical and contextual significance in n space on multiple dimensions by a method comprising the steps of:
      the computer grouping the data items at time N+1 into clusters as points based on predetermined parameters;
      the computer determining centroids of the clusters;
      for each cluster, the computer:
         analyzing a distance between the centroid and the points of the cluster to determine a measurement of dispersion; and
         if the distance of the data item from the centroid of the cluster is not within a predetermined measurement of dispersion for the cluster, searching for causal context factors which contributed to the distance of the data item within the cluster to be outside of the predetermined measurement of dispersion from the centroid of the cluster and storing the factors in a repository.

2. The method of claim 1, wherein the predetermined parameter is a demographic parameter.

3. The method of claim 1, wherein the predetermined parameter is a phenotypic parameter.

4. The method of claim 1, wherein the predetermined parameter is a geographic parameter.

5. The method of claim 1, wherein the clusters are defined by cluster size.

6. The method of claim 1, wherein the clusters are defined by number of clusters.

7. The method of claim 1, wherein the clusters are defined by density of clusters.

8. A computer program product for determining whether a change in value of a data item relating to an entity being tracked within a cohort satisfies a predetermined measurement of statistical and contextual significance, a computer comprising at least one processor, one or more memories, one or more computer readable storage media, the computer program product comprising a non-transitory computer readable storage medium having program instructions embodied therewith, the program instructions executable by the computer to perform a method comprising:
   capturing, by the computer, a plurality of data items relating to the entity being tracked at a time N+1 by a plurality of sensors with the plurality of sensors having varied sensitivity for each of the plurality of data items being captured;
   comparing, by the computer, the value of one of the data items at time N+1 to a value of a historical data item at time N;
   if the value of one of the data items at time N+1 is different from the value of the historical data item at time N, determining, by the computer, that a change has occurred;
   if a change in one of the data items has occurred, determining, by the computer, whether the change in one of the data items related to the entity being tracked satisfies a predetermined measurement of statistical and contextual significance in n space on multiple dimensions by a method comprising the steps of:
      grouping, by the computer, the data items at time N+1 into clusters as points based on predetermined parameters;
      determining, by the computer, centroids of the clusters;
      for each cluster:
         analyzing, by the computer, a distance between the centroid and the points of the cluster to determine a measurement of dispersion; and
         if the distance of the data item from the centroid of the cluster is not within a predetermined measurement of dispersion for the cluster, searching, by the computer, for causal context factors which contributed to the distance of the data item within the cluster to be outside of the predetermined measurement of dispersion from the centroid of the cluster and storing the factors in a repository.

9. The computer program product of claim 8, wherein the predetermined parameter is a demographic parameter.

10. The computer program product of claim 8, wherein the predetermined parameter is a phenotypic parameter.

11. The computer program product of claim 8, wherein the predetermined parameter is a geographic parameter.

12. The computer program product of claim 8, wherein the clusters are defined by cluster size.

13. The computer program product of claim 8, wherein the clusters are defined by number of clusters.

14. The computer program product of claim 8, wherein the clusters are defined by density of clusters.

15. A computer system for determining whether a change in value of a data item relating to an entity being tracked within a cohort satisfies a predetermined measurement of statistical and contextual significance comprising a computer comprising at least one processor, one or more memories, one or more computer readable storage media having program instructions executable by the computer to perform the program instructions comprising:

capturing, by the computer, a plurality of data items relating to the entity being tracked at a time N+1 by a plurality of sensors with the plurality of sensors having varied sensitivity for each of the plurality of data items being captured;

comparing, by the computer, the value of one of the data items at time N+1 to a value of a historical data item at time N;

if the value of one of the data items at time N+1 is different from the value of the historical data item at time N, determining, by the computer, that a change has occurred;

if a change in one of the data items has occurred, determining, by the computer, whether the change in one of the data items related to the entity being tracked satisfies a predetermined measurement of statistical and contextual significance in n space on multiple dimensions by a method comprising the steps of:

grouping, by the computer, the data items at time N+1 into clusters as points based on predetermined parameters;

determining, by the computer, centroids of the clusters;

for each cluster:

analyzing, by the computer, a distance between the centroid and the points of the cluster to determine a measurement of dispersion; and if the distance of the data item from the centroid of the cluster is not within a predetermined measurement of dispersion for the cluster, searching, by the computer, for causal context factors which contributed to the distance of the data item within the cluster to be outside of the predetermined measurement of dispersion from the centroid of the cluster and storing the factors in a repository.

16. The computer system of claim 15, wherein the predetermined parameter is a demographic parameter.

17. The computer system of claim 15, wherein the predetermined parameter is a phenotypic parameter.

18. The computer system of claim 15, wherein the predetermined parameter is a geographic parameter.

19. The computer system of claim 15, wherein the clusters are defined by cluster size.

20. The computer system of claim 15, wherein the clusters are defined by number of clusters.

* * * * *